United States Patent Office  
3,066,166  
Patented Nov. 27, 1962

3,066,166  
PROTECTIVE AGENTS  
Friedrich Muth, Leverkusen, Germany; Herta Drapal, Leverkusen, Germany, sole heiress of Othmar Drapal, deceased, late of Leverkusen, Germany; and Otto Bayer, Leverkusen, Germany; assignors to Farbenfabriken Bayer Aktiengesellschaft, Leverkusen, Germany, a corporation of Germany  
No Drawing. Filed Sept. 30, 1958, Ser. No. 764,254  
5 Claims. (Cl. 260—556)

The present invention relates to new agents showing a protective action against the attack of textile pests, mold and bacteria. The active compounds are sulfonamides of halogeno-alkyl sulfonic acids and amines of the halogenated polynuclear series. In these polynuclear amines the nuclei are linked either directly by a C—C-linkage (diphenyls) or by bridging members such as —O-(diphenyloxides), —S-(diphenylsulfides, —SO—, —CH$_2$-(diphenylmethanes). These nuclei furthermore have to be substituted in their nuclei by halogens especially by chlorine atoms.

These active compounds correspond to the general formula

Hal—R$_1$—SO$_2$—NH—R

In this formula R is a polynuclear radical of the above said type, and R$_1$ is a lower aliphatic hydrocarbon radical.

Suitable compounds of this type are e.g. the amides of chloromethane sulfonic acid and halogenated aminodiphenyls, aminodiphenyl ethers, or thioethers, especially their chloro-substitution products containing three, four, five and more chlorine atoms; further the corresponding amides of chloro-ethane sulfonic acid, trichloroethane sulfonic acid, and the like as well as amides of the mentioned kind which are further substituted in the sulfonamide group e.g. by the trichloroacetyl radical. The following formulae may illustrate the scope of this invention without, however, limiting it:

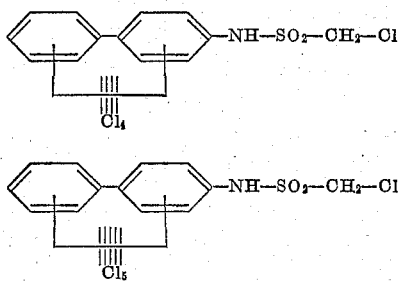

or the corresponding o- or m-chloromethane sulfonylamides,

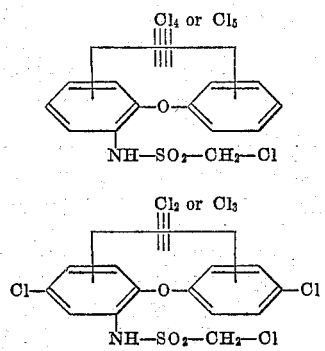

or the corresponding m- or p-chloromethane sulfonylamides. It should be understood that in the above formulae those chlorine atoms whose positions on the ring is not expressly designated are to be construed as being nuclearly attached on any open position of either ring alone or shared by both rings.

These compounds are prepared by chlorinating the basic halogen-free (or less halogen containing) compounds by introducing chlorine in the sulfonyl-amides or by chlorination with sulfonyl chloride by known methods. The position of the chlorine atoms so introduced cannot be determined exactly, but they definitely are attached to the phenyl rings. Mostly these compounds are mixtures of various different tri-, tetra- or penta-chloro compounds:

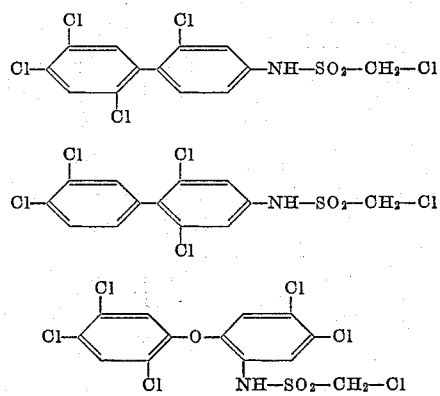

These or similar compounds may be prepared synthetically from basic compounds containing already the halogen in a known position.

These compounds can be prepared by condensing the said amines with the mentioned sulfonic chlorides in the presence of pyridine, in some cases also in the presence of alkalies. By chlorinating the sulfonamides thus prepared in known manner the higher chlorinated products, if desired, are obtained.

In comparison with known amides of halogeno-alkyl sulfonic acids and mononuclear amines the polynuclear sulfonamides of the described kind are distinguished by improved properties, especially by an increased affinity to animal fibres, by an improved fastness to washing and to milling, and partly also by an increased activity against textile pests. These active compounds are applied in the usual manner, e.g. as solutions in organic solvents conventional in dry cleaning, as water-soluble salts in aqueous solutions, as emulsions or dispersions in aqueous media, as additions to soaping and milling liquors, as additions to dye liquors in the form of water-soluble salts, as powders in the form of pulverulent inert materials impregnated therewith for drumming skins and furs. They protect, however, not only keratin-containing materials but also others, like fibrous materials of cellulose or regenerated cellulose such as cotton and rayon against silverfish, upholstering material made from palm leaves (Afrique) against mites. It is of great interest and importance that keratin-containing materials, in particular wool, are protected by the new compounds also against the attack of white ants.

The present invention is illustrated by the following examples without, however, being limited thereto:

Example 1

Goods made of wool or of woolen mixed yarns are treated in an aqueous solution which contains per liter 1 gram of the sodium salt of the tetrachloro-(4-phenyl)-anilide of chloromethane sulfonic acid and are dried after hydro-extracting or squeezing. The material—which may also be skin or fur material—is by this process, also after repeated washing, protected against damage by textile pests. Owing to the fungicidal and bactericidal action of the applied compound, the material thus treated is also protected against damage by bacteria and mold.

The active compound is obtained in the following way: 169 grams of 4-amino diphenyl is reacted in 68 ml. of pyridine with 149 grams of chloromethane sulfonic chloride at about 0° C. The 277 grams of (4-phenyl)-anilide of the chloromethane sulfonic acid thus obtained are chlorinated in 1400 ml. of o-dichlorobenzene in the presence of catalytic quantities of iron (14 grams of $FeCl_3$) by introducing 480 grams of chlorine at temperatures up to 42° C. The product in a usual manner obtained contains 47.8% of Cl and 7.2% of S. Yield 420 grams.

Similar effects are obtained with products the chlorine content of which is varying, e.g., products with altogether 6 or more chlorine atoms. The chlorine derivative with 42.25% of Cl which is obtained by chlorinating the (2- or 3-phenyl)-anilide of the chloromethane sulfonic acid (M.P. 81° C.) shows the same effect as the first mentioned compound. The same behavior is also shown by mixtures of the chlorinated derivatives obtained from technical 2- and 4-amino diphenyl mixtures.

Of similar activity are the after-chlorinated amides obtained from 4-amino diphenyl and fluoromethane sulfonic chloride, bromomethane sulfonic chloride, β-chloroethane sulfonic chloride, β,β-dichloroethane sulfonic chloride, β,β,β-trichloroethane sulfonic chloride, α,β-dichloroethane sulfonic chloride.

Example 2

Goods made of wool or of woolen mixed yarns are treated in the manner of the dry cleaning process in organic solvents which contain 0.3–1% of the [2-(2-'chlorophenoxy)-3.5-dichloro]-anilide of chloromethane sulfonic acid. The treated material—which may also be skin or fur material—is protected against damage by textile pests.

The product used above is obtained by reacting 288 grams of 2-(2'-chlorphenoxy)-3.5-dichloroaniline with 149 grams of chloromethane sulfonic chloride in the presence of 2000 ml. of pyridine at temperatures below 0° C. The reaction mixture is then poured in water, filtered and the residue purified by dissolving it in very dilute sodium hydroxide solution and precipitating with hydrochloric acid (M.P. 71° C.). In a similar way the amides of chloromethane sulfonic acid and 2-amino-4.4'-dichlorodiphenyl ether (M.P. 127° C.) or 2-amino-5.4'-dichlorodiphenyl ether (M.P. 76° C.) are obtained showing similar properties.

The same good properties has the chloromethane sulfonyl-2-(2'.4'.5'-trichlorphenoxy)-4.5-dichloro anilide of the following formula

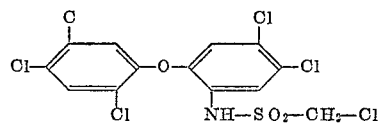

which may be prepared as follows:

238 grams of 2.4.5-trichlorophenol are dissolved in 300 ml. of chloro benzine. A catalytic amount of copper powder has been added and thereafter there are introduced 220 grams of 5-nitro-1.2.4-trichloro benzine; the reaction mixture is heated for 12 hours while stirring at about 140° C. After filtration the chlorobenzine is removed by steam distillation and the residue re-crystallized from methanol. The above shown product melts at 104 to 105° C.; 400 grams of this compound are dissolved in 5 times its amount of N-butanol and reduced with iron and acetic acid to the corresponding amino compound. There are obtained after re-crystallizing from methanol 360 grams of the amino compound. This amine is dissolved in 1200 ml. of pyridine and while stirring and cooling at 0° C. there are added slowly 150 grams of chloromethane sulfonyl chloride. The reaction mixture is poured into water. The precipitate is removed by filtration and purified by stirring with weak alkaline solution (5% of sodium hydroxide). From the alkaline solution there is obtained by acidifying the above shown compound which after re-crystallizing from ligroin melts at 144 to 145° C.

Also good properties shows a chloromethane sulfonyl-2-(penta-chloro-phenoxy)-anilide which may be prepared in the following way:

Chloromethane sulfonyl-2-amido-diphenyl ether prepared by chloromethyl sulfonation of 2-amino-diphenyl ether has been dissolved in 10 times its amount of dichloro benzene. The catalytic amount of $FeCl_3$ is added and chlorine is introduced at 20° C. up to an extent of 42%. The reaction then is stopped and the reaction mixture is extracted with diluted sodium hydroxide solution (5 to 10%). From the alkaline solution the penta-chloro-compound is obtained by acidifying, it is obtained as a yellowish colored resin which may be purified by dissolving in methanol and treating this solution with activated carbon black and fuller's earth. After distilling off the methanol the reaction product then is only slightly honey colored, and may be used as such. The chlorine content is about 42 to 44%, i.e., about 5 to 6 chlorine atoms in the two nuclear.

Example 3

0.3–1 gram per liter of the tetrachloro-(4-phenyl)-anilide of chloromethane sulfonic acid of Example 1 are added as a tri-ethanolamine salt to the dyeing liquors of acid or neutral wool and union dyestuffs respectively, and dyed in the usual manner. The dyed material is, after finishing, protected against damage by textile pests.

Example 4

Suitable inert material, e.g. sand, wood-dust, talc and others are impregnated with tetrachloro-(4-phenyl)-anilide of chloromethane sulfonic acid of Example 1 by means of an organic solvent which is afterwards evaporated, and this mixture is added to the sawdust used for drumming furs and skins. The furs and skins drummed under adding the mentioned active ingredient (about 2% in the sawdust) are, after finishing, protected against damage by keratin eating pests.

Example 5

Goods made of wool or of woolen mixed yarns are treated in the manner of the dry cleaning process in organic solvents which contain 1–2% of the [3-(4'-chlorophenyl sulfonyl)-6-chloro]-anilide of chloromethane sulfonic acid, or of the (4-phenylazo)-anilide of chloromethane sulfonic acid, or chloromethane sulfonyl-1-aminonaphthalene.

The material—which may also be skin or fur material—is protected against damage by textile pests.

These compounds are obtained by condensing the amines in question with chloromethane sulfonic chloride in the presence of pyridine. The condensation products are purified by re-dissolving by way of their sodium salts.

This application is a continuation-in-part application of our abandoned application Serial No. 308,706, filed September 9, 1952.

We claim:
1. The compounds of the formula

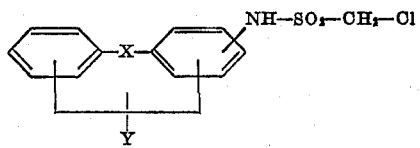

wherein X stands for a member selected from the group consisting of a direct C—C-linkage and an oxygen atom, and Y stands for 3 to 5 chlorine atoms.

2. The compounds of the formula

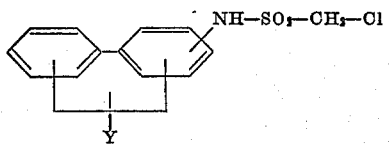

wherein Y stands for 3 to 5 chlorine atoms.

3. The compounds of the formula

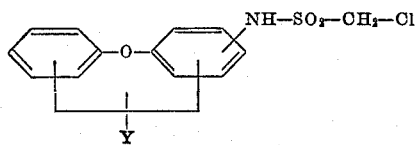

wherein Y stands for 3 to 5 chlorine atoms.

4. The compounds of the formula

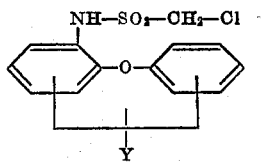

wherein Y stands for 3 to 5 chlorine atoms.

5. The compound of the formula

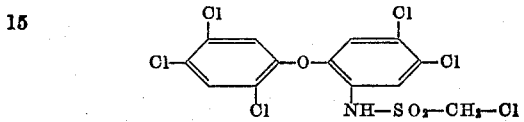

References Cited in the file of this patent

UNITED STATES PATENTS

| | | |
|---|---|---|
| 2,148,928 | Mewron | Feb. 28, 1939 |
| 2,361,188 | Fox | Oct. 24, 1944 |
| 2,666,788 | Ebel | Jan. 19, 1954 |

FOREIGN PATENTS

| | | |
|---|---|---|
| 839,278 | Germany | July 8, 1949 |
| 890,883 | Germany | Sept. 24, 1953 |